United States Patent [19]

Odam et al.

[11] 4,136,219

[45] Jan. 23, 1979

[54] METHOD OF APPLYING POLYURETHANE PAINT TO VULCANIZED RUBBER

[76] Inventors: Norman E. Odam, Vanderweydendreef 29, 1900-Overijse; Bernard Costemalle, 15 Ave. Valentin Tandeur, 1610-Waterloo, both of Belgium

[21] Appl. No.: 779,277

[22] Filed: Mar. 18, 1977

Related U.S. Application Data

[63] Continuation of Ser. No. 630,149, Nov. 10, 1975, abandoned, which is a continuation of Ser. No. 441,404, Feb. 11, 1974, abandoned.

[30] Foreign Application Priority Data

Feb. 9, 1973 [GB] United Kingdom ................. 6445/73

[51] Int. Cl.² .............................................. B05D 3/02
[52] U.S. Cl. .................................. 427/385 B; 260/3.5; 260/5; 260/888; 428/425; 428/492; 428/500; 428/521
[58] Field of Search ..................... 427/385 B; 428/492, 428/500, 521, 425; 260/3.5, 5, 888

[56] References Cited

U.S. PATENT DOCUMENTS

| | | | |
|---|---|---|---|
| 2,657,730 | 11/1953 | Cuthbertson et al. | 156/110 |
| 2,746,515 | 5/1956 | Usack | 156/116 |
| 2,752,317 | 6/1956 | Sudekum | 260/29.1 |
| 3,028,346 | 4/1962 | Leniszka et al. | 260/5 |
| 3,098,755 | 7/1963 | Baith et al. | 428/425 |
| 3,528,848 | 9/1970 | Zoebelein | 428/521 |
| 3,607,360 | 9/1971 | Elmer | 427/385 |
| 3,619,272 | 11/1971 | Shepherd et al. | 427/207 R |
| 3,630,974 | 12/1971 | Ladocsi et al. | 260/888 |
| 3,648,748 | 3/1972 | Lovell | 428/425 |
| 3,697,306 | 10/1972 | Miller | 427/407 |
| 3,752,694 | 8/1973 | Sayigh et al. | 428/425 |
| 3,764,370 | 10/1973 | Bragole | 426/333 |
| 3,813,257 | 5/1974 | West | 428/425 |
| 3,887,756 | 6/1975 | Gerstin et al. | 428/425 |
| 3,935,329 | 1/1976 | Reilly et al. | 428/521 |

*Primary Examiner*—Ronald H. Smith
*Assistant Examiner*—Sadie L. Childs
*Attorney, Agent, or Firm*—W. T. Clarke; John J. Mahon

[57] ABSTRACT

Polyurethane paint is applied with good adhesion to a vulcanized rubber surface composed of halogenated butyl rubber or blends thereof with natural rubber, SBR rubber, EPDM rubber, polybutadiene rubber, acrylonitrile butadiene rubber, polychlorophrene rubber, synthetic polyisoprene rubber, or chloro sulfonated polyethylene rubber, the blends containing at least 30 phr halogenated butyl rubber, the rubber having been cured using a metal oxide or halide and an alkyl phenol polysulfide accelerator.

5 Claims, No Drawings

METHOD OF APPLYING POLYURETHANE PAINT TO VULCANIZED RUBBER

This is a continuation of application Ser. No. 630,149 filed Nov. 10, 1975, now abandoned, which in turn is a continuation of application Ser. No. 441,404 filed Feb. 11, 1974, now abandoned.

This invention relates to a process of applying paint, especially polyurethane paint, to vulcanized rubber parts.

There are at present two main processes for applying polyurethane paint to vulcanized rubber parts. In one method the rubber surface is sensitised by a benzophenone spray on the rubber surface, the sprayed surface is then subjected to U.V. irradiation followed by primer application. Finally the polyurethane paint is applied. The disadvantage of this process is that it involves complicated and lengthy painting procedure and is expensive due to the use of special chemicals and the various steps involved.

In another process one has to use a resin cure for the rubber, activated by the addition of halogenated rubbers. No primer is used and the polyurethane paint is simply applied onto the clean rubber part surface. The disadvantages of this process are that the resin cure is expensive, slow and steam cannot be used as the heat transfer agent. Also the resin cure is incompatible with a sulphur cure which makes covulcanization of different parts more difficult. (e.g. the adhesion of sidewalls to a carcass.)

We have now found a process of applying paint, e.g. polyurethane paint, to a rubber surface which is simple and which avoids the disadvantages of the above-mentioned processes.

According to this invention paint is applied to a rubber surface by a process which comprises applying paint to a rubber surface which is either (1) rubber derived from a composition comprising 30–100 parts by weight per hundred parts by weight of rubber (phr) of halogenated butyl rubber which has been cured either using a metal oxide or halide and an alkyl phenol polysulphide accelerator, or a metal oxide or halide in the presence of a non-reactive phenol/aldehyde resin or using a metal oxide or halide and an alkyl polysulphide accelerator in the presence of a non-reactive phenol/aldehyde resin, or (2) a rubber blend comprising an ethylene-propylene-diene terpolymer and a halogenated rubber cured with sulphur or sulphur-containing vulcanizing agent using a metal oxide or halide in the presence of a non-reactive phenol aldehyde resin. By non-reactive we mean non-reactive to any component in the formulation.

The rubber composition comprising 30–100 phr of halogenated butyl rubber, may be 100% halogenated butyl rubber e.g. chlorobutyl rubber, or blends of halogenated butyl rubber with other rubbers, e.g. natural rubber, styrene-butadiene rubber, ethylene-propylene-diene terpolymer rubber (hereinafter abbreviated to EPDM), polybutadiene rubber, acrylonitrile butadiene rubber, polychloroprene rubber, synthetic polyisoprene rubber or chlorosulphonated polyethylene (Hypalon).

Butyl rubber comprises a copolymer of a major proportion, e.g. 85–99.9 wt.%, preferably 95–99.5 wt.% of a $C_4$–$C_8$ isoolefin such as isobutene, with a minor proportion, e.g. 0.1 to 15 wt.% preferably 0.5 to 5 wt.% of a $C_4$–$C_{14}$ multiolefin, preferably a $C_4$–$C_8$ diolefin, such as butadiene, dimethyl butadiene, piperylene or isoprene. The preferred butyl rubber is obtained by reacting 95–99.5 wt.% of isobutylene with 0.5 wt.% to 5 wt.% of isoprene.

In producing halogenated butyl rubber unmodified, unvulcanized butyl rubber is halogenated, e.g. chlorinated or brominated, so as to contain at least 0.5 wt.% and preferably at least 1.0 wt.% of combined halogen, but not more than one atom of chlorine or three atoms of bromine contained in the polymer per molecule of multiolefin present therein. Halogenated butyl rubber usually has a viscosity average molecular weight of between 150,000 and 1,500,000 and a mole percent unsaturation of between 0.5 and 15%.

Styrene-butadiene rubber (abbreviated SBR) is usually made by the co-polymerisation of butadiene with styrene, for example about 3 parts by weight of butadiene with 1 part by weight of styrene, the monomers being suspended in finely divided emulsion form in a large proportion of water in the presence of a detergent. Also SBR can be made by a solution polymerization process.

Ethylene-propylene-diene terpolymers are usually prepared by contacting a feed stream containing ethylene, propylene and a polymerizable diolefin with a Ziegler catalyst in the presence of an inert saturated $C_5$ to $C_8$ hydrocarbon diluent, e.g. an alkane or cycloalkane such as n-pentane, isopentane, n-hexane, isohexane or n-octane. The copolymerization is usually carried out at a pressure of 1 to 5 atmospheres. The third polymerization olefin is usually a $C_6$ to $C_{16}$ non-conjugated diolefin, e.g. 1,5-hexadiene, 1,5-octadiene or a 2-alkyl norbornadiene, preferably ethylidene norbornene or methylidene norbornene.

Examples of rubber compositions comprising 30–100 phr of halogenated rubber are 75–85, e.g. 80, parts of chlorobutyl and 15–25, e.g. 20, parts of natural rubber; 30–40, e.g. 35, parts of chlorobutyl, 20–30, e.g. 25, parts of natural rubber, 20–30, e.g. 25, parts of styrene-butadiene rubber and 10–20, e.g. 15, parts of EPDM; and 40–60, e.g. 50, parts of chlorobutyl and 40–60, e.g. 50, parts of EPDM, all parts being parts by weight.

In order to obtain proper adhesion of the paint to the halogenated butyl rubber-containing composition it is essential that the rubber be cured using a metal oxide or halide with an alkyl phenol polysulphide accelerator and/or in the presence of a non-reactive phenol/aldehyde resin.

The metal forming the oxide or halide is preferably a metal of Groups IIB, IIIB, IVB and VIII of the Periodic Table. Thus, these metal compounds may be an oxide, chloride or bromide of zinc or tin, zinc oxide being particularly preferred. The preferred quantity of metal oxide or halide which is used is 3 to 20 parts by weight per 100 parts by weight of rubber.

Preferably an alkyl phenol dusilphide is used, and suitable alkyl phenol disulphides are those having alkyl grops containing 1–5 carbon atoms. A particularly preferred alkyl phenol disulphide is that known as Vultac 5.

The phenols from which the non-reactive phenol/aldehyde resins are derived may be mono- or dihydroxy benzenes. Dihydroxy benzenes having the hydroxyl groups meta with respect to each other are particularly suitable. Examples of suitable phenols are phenol, cresols, xylenols, trimethyl phenols, mono or dichlorophenols, hydroquinone, or resorcinol or its derivatives.

The preferred aldehyde from which the non-reactive phenol/aldehyde resins are derived are formaldehyde or substances supplying formaldehyde such a paraformaldehyde, or acetaldehyde or furfural.

The resin is usually produced by condensation of the phenol and aldehyde in the presence of a small amount of an acid. A particularly suitable non-reactive phenol/aldehyde resin is the phenol/formaldehyde resin known as Amberol ST-137X. The preferred quantity of non-reactive phenol/aldehyde resin is 0.1 to 30 parts by weight per 100 parts by weight of rubber.

Various fillers and extenders can be used, and these include various carbon blacks, e.g. SAF, HAF, SRF and EPC, clays, silicas, carbonates, oils, resins and waxes. The carbon black is generally added in an amount of 30–150 parts by weight per hundred parts by weight of rubber.

Conventional curatives for halobutyl rubbers, including sulphur, sulphenamide derivatives, benzothiazyl disulphide (i.e. 2,2-dithiobisbenzothiazole) and tetramethyl thiuram disulphide, may also be present.

The curing usually take place at a temperature of between 140° C. and 250° C., preferably 150° C. to 200° C., and usually takes from 1 to 150 minutes, and usually 20 to 60 minutes. The rubber may be press cured i.e. shaped and vulcanised by using a mould which is placed either in a conventional heated press, a transfer press or an injection moulding machine.

The alternative rubber is a blend comprising ethylene-propylene-diene terpolymer (EPDM) and a halogenated rubber curved with a sulphur or a sulphur-containing vulcanising agent in the presence of a non-reactive phenol/aldehyde resin.

The blend is a mixture of EPDM with other halogenated rubbers and one can use a blend of EPDM with chlorobutyl rubber; thus 60–80, e.g. 70, wt.% of EPDM and 40–20, e.g. 30, wt.% of chlorobutyl rubber, a blend of EPDM with polychloroprene, or with chlorosulphonated polyethylene.

The non-reactive phenol/aldehyde resin which is used is the same as that described above, and is preferably Amberol ST-137X.

The rubber comprising EPDM rubber and halogenated rubber may be cured not only in the presence of the metal oxide or halide, sulphur or sulphur containing vulcanising agents and non-reactive phenol/aldehyde resin but also in the presence of various carbon blacks, oils, resins, waxes, and mineral fillers such as silicas, carbonates or clays.

The curing usually takes place at a temperature of from 150° to 250° C., for about 1 to 60 minutes, e.g. about 30 minutes at 160° C.

After curing the rubber is then painted with the desired paint. This paint can be a polyurethane paint, i.e. paint containing a polyurethane resin. Such resins result from the reaction of diisocyanates (e.g. toluene diisocyanate or 4,4[1] diphenyl methane diisocyanate) with polyols (e.g. glycerol, pentaerythritol, phenols, polyethers or polyester). They are usually packaged as a single component or as a two component coating system. Other paints which may be used include acrylic paints.

Preferably the rubber is cleaned, e.g. with a hexane solvent, before painting.

It is found that by the process of this invention not only is there very good adhesion between the rubber and the paint coating but the drawbacks of the prior part process are eliminated, i.e. the procedure is simple, requiring no sensitizer or UV treatment, steam cure is possible, compatibility with sulphur cures is obtained and a rapid cure rate is available.

In the following Examples the rubbers which were used have the following properties:

| | |
|---|---|
| Chlorobutyl HT 10–68 | Viscosity molecular weight 400,000 to 480,000 Isobutylene content: 98.2 mole % Isoprene content: 1.8 mole % |
| Vistalon 4603 | Mooney viscosity ML (1+8) at 126° C = 57–67 ethylidene norbornene: 3–4 wt.% ethylene 50–55 wt.% remainder propylene |
| Vistalon 2504 | Mooney viscosity ML (1+8) at 100° C = 40 ± 5 ethylidene norbornene 3–4 wt.% ethylene 50–55 wt.% remainder propylene |
| Vistalon 5600 | Mooney viscosity ML (1+8) at 126° C = 65–75 ethylidene norbornene: 6–7 wt.% ethylene content: 60–70 wt.% remainder propylene |
| SBR 1500 | A cold non pigmented styrene-butadiene rubber containing 23.5 wt.% styrene - Viscosity ML (1+4) at 100° C = 52. |

EXAMPLE 1

The formulations containing chlorobutyl were prepared and then press-cured. After curing the surfaces of the rubber were cleaned with a hexane solvent and then painted with a polyurethane paint (Cuvertin ml paint)

The formulations were

| | A (pt by wt) | B (pt by wt) |
|---|---|---|
| Chlorobutyl HT 10–63 | 100 | 100 |
| HAF black | 50 | 50 |
| Naphthanic oil | 10 | 10 |
| Stearic acid | 1 | 1 |
| Zinc oxide | 5 | 5 |
| MBTS (benzothiazyl disulphide) | 1 | 1 |
| THIDS (tetramethyl thiuram disulphide) | 2 | 0 |
| Sulphur | 0.5 | 0 |
| Vultac 5 | 0 | 1.5 |

Adhesion was assessed following a standard paint adhesion procedure
(a) Tape test — tape stripping of a 30° "X" cut. G.M. specification GM 4489 — PIV. Tape 3M Scotch N°710 (or equivalent).

Standard tensile test pads (sheets of 2.0 mm thickness) were moulded in the conventional manner except that the rubber surface was protected from contamination by mould release agents or dirt by means of a Mylar film.

After a one to two day conditioning period, the Mylar film was removed and the rubber was painted using an appropriate polyurethane based paint (one pack aluminium pigmented paint).

After a drying time of 2 to 4 days, the tape test GM 4489 — PIV was carried out.
(b) Above test before ageing and after ageing in an air oven (7 days at 60° C.) and water immersion (7 days at 50° C.).

The results were as follows

| | Initial | After Air Ageing | After Water Ageing |
|---|---|---|---|
| A | fail | fail | fail |
| B | pass | pass | pass |

Thus, the advantage of using an alkyl phenol disulphide accelerator (Vultac 5) is clearly shown

EXAMPLE 2

The formulations based on CHLOROBUTYL and natural rubber were prepared, press-cured and then painted and tested as in Example 1:

|  | A (pt by wt) | B (pt by wt) |
|---|---|---|
| CHLOROBUTYL HT 10-68 | 80 | 80 |
| Natural Rubber | 20 | 20 |
| HAF Black | 50 | 50 |
| Napthenic Oil | 10 | 10 |
| Stearic Acid | 1 | 1 |
| Zinc Oxide | 5 | 5 |
| Vultac 5 | 0 | 1 |
| MBTS | 1 | 1 |
| TMTDS | 2 | 0 |
| Sulphur | 0.5 | 0 |

Results of the Tests

|  | Initial | After Air Ageing | After Water Ageing |
|---|---|---|---|
| A | fail | fail | fail |
| B | pass | pass | pass |

Again the advantage of using Vultac 5 is clearly shown.

EXAMPLE 3

A typical radial type sidewall formulation based on a blend of EPDM (Vistalon 4608), CHLOROBUTYL HT 10-68, natural rubber and SBR 1500, (styenebutadiene rubber) was prepared and tested as in Example 1. The formulation was as follows:

|  | Parts by weight |
|---|---|
| Vistalon 4608 | 15 |
| CHLOROBUTYL HT 10-68 | 35 |
| Natural Rubber | 25 |
| SER 1500 | 25 |
| GPT Black | 60 |
| Naphthenic Oil | 30 |
| Stearic Acid | 2 |
| Zinc Oxide | 3 |
| Vultac 5 | 1.5 |
| MBIS | 0.8 |
| Sulphur | 0.8 |

Results of the tests

|  | Initial | Air Ageing | Water Ageing |
|---|---|---|---|
| Steam Cure | pass | pass | pass |
| Press Cure | pass | pass | pass |

NB The above sidewall contains no chemical antiazonants which are normally incorporated in radial tyre sidewalls and are highly staining, and is therefore ideal for paint application. In this formulation protection against weathering and ozone attack is obtained via the incorporation of EPDM and chlorobutyl rubbers.

EXAMPLE 4

The following formulations show the adhesion improvement obtained through the use of a phenol formaldehyde resin, Amberol ST 137X

|  | A (pt by wt) | B (pt by wt) |
|---|---|---|
| Vistalon 2504 (LPDM) | 100 | 70 |
| CHLOROBUTYL RT 10-66 | 0 | 30 |
| FEP Black | 80 | 80 |
| Paraffinic Oil | 20 | 20 |
| Stearic Acid | 1 | 1 |
| Zinc Oxide | 5 | 5 |

The three formulations were respectively cured with the two following cure systems:

|  | 1 | 2 |
|---|---|---|
| Sulphur | 2 | 2 |
| MBT (mercapto benzothiazole) | 1.0 | 1.0 |
| TMDS | 0.8 | 0.8 |
| ZDBDC (zinc dibutyl dithicarborate) | 0.8 | 0.8 |
| Amberol ST 137X | 0 | 15 |

The results of the tape test were as follows:

| Formulation | Cure System | Initial | Adhesion Air Aged | Water Aged |
|---|---|---|---|---|
| A | 1 | failed | failed | failed |
| B | 1 | failed | failed | failed |
| A | 2 | failed | failed | failed |
| B | 2 | pass | pass | pass |

The results indicate that a straight sulphur cure does not give the required level of adhesion, either in 100% EPDM (A-1) or in a 70/30 blend of EPDM and chlorobutyl rubber (B-1). However the combined effects of chlorobutyl rubber and ST 137X lead to a satisfactory level of adhesion (B-2).

EXAMPLE 5

The following formulation was prepared, press-cured for 15 mins. at 165° C., painted and tested as before:

| CHLOROBUTYL HT 10-68 | 50 |
|---|---|
| Vistalon 5600 (EPDM) | 50 |
| FEF | 70 |
| Paraffinic Oil | 25 |
| Zinc Oxide | 5 |
| Stearic Acid | 1 |
| Sulphur | 1.5 |
| MBTS | 1 |
| Vultac 5 | 2 |

Result of tests

|  | Initial | After Air Ageing | After Water Ageing |
|---|---|---|---|
| Paint adhesion | pass | pass | pass |

What is claimed is:

1. The process of applying a polyurethane paint to a vulcanized rubber surface, said vulcanized rubber being selected from the group consisting of halogenated butyl rubber and blends of same with a rubber selected from the group consisting of natural rubber, styrene butadiene rubber, EPDM rubber, polybutadiene rubber, acrylonitrile butadiene rubber, polychloroprene rubber, synthetic polyisoprene rubber, or chloro sulfonated polyethylene rubber, said blends containing at least 30 parts of halogenated butyl rubber per hundred parts by weight of vulcanized rubber, said rubber having been cured using a metal oxide or halide and an alkyl phenol polysulfide accelerator, said process consisting essentially of the step of applying said paint to the cured rubber surface, said rubber surface being substantially unmodified after curing whereby good adhesion of said paint on said surface is obtained.

2. The process of claim 1 wherein a blend of 75-85 parts by weight of chlorobutyl rubber and 15-25 parts by weight of natural rubber are used.

3. The process of claim 1 wherein the halogenated butyl rubber is cured at a temperature of between 150° C. and 200° C.

4. The process of claim 1 wherein the rubber consists essentially of 60-80 wt.% of said ethylene-propylene-diene terpolymer and 20-40 wt.% of chlorobutyl rubber.

5. The process of claim 1 wherein the metal oxide is zinc oxide.

* * * * *